United States Patent
Linsky

(10) Patent No.: US 7,035,314 B1
(45) Date of Patent: Apr. 25, 2006

(54) METHOD AND APPARATUS IMPLEMENTING AN OVERLAY ADAPTIVE FREQUENCY HOPPING KERNEL IN A WIRELESS COMMUNICATION SYSTEM

(75) Inventor: Joel B. Linsky, San Diego, CA (US)

(73) Assignee: RFMD WPAN, Inc., San Diego, CA (US)

(*) Notice: Subject to any disclaimer, the term of this patent is extended or adjusted under 35 U.S.C. 154(b) by 659 days.

(21) Appl. No.: 10/235,090

(22) Filed: Sep. 3, 2002

(51) Int. Cl.
*H04B 1/713* (2006.01)

(52) U.S. Cl. .................................... 375/133
(58) Field of Classification Search ......... 375/132–137
See application file for complete search history.

(56) References Cited

U.S. PATENT DOCUMENTS

2001/0022805 A1* 9/2001 Dabak et al. ............... 375/132
2002/0136268 A1* 9/2002 Gan et al. .................. 375/133

OTHER PUBLICATIONS

Bluetooth Special Interest Group (SIG), entitled Specification of the Bluetooth System, version 1.1", published Feb. 22, 2001, Section 1, Part B, Section 1, pp. 41-42, Section 2.1, p. 43, Section 4.1-2, pp. 47-50, Section 10.9, p. 120 and Section 11, pp. 126-137. Website: www.bluetooth.com.

Jaap C. Haartsen, Method for FH Sequence Adaptation, Ericsson, Mar. 16, 2000.

* cited by examiner

*Primary Examiner*—Don N. Vo
(74) *Attorney, Agent, or Firm*—Withrow & Terranova, PLLC

(57) ABSTRACT

A novel method and apparatus for implementing an overlay adaptive frequency-hopping kernel in a wireless communication system is described. The present inventive method and apparatus selects hopping frequencies based on channel conditions. Hopping frequencies are selected using an inventive overlay adaptive frequency-hopping (OAFH) kernel that maps bad channels to good channels while retaining the pseudo-random properties of the original frequency-hopping sequence. The OAFH kernel uses existing FH kernels to initially select hopping frequencies. If the initially selected hopping frequency has bad channel condition characteristics, the OAFH kernel maps the initially selected hopping frequency to a substitute hopping frequency having good channel condition characteristics.

5 Claims, 8 Drawing Sheets

METHOD AND APPARATUS IMPLEMENTING AN OVERLAY ADAPTIVE FREQUENCY HOPPING KERNEL IN A WIRELESS COMMUNICATION SYSTEM

BACKGROUND OF THE INVENTION

1. Field of the Invention

This invention relates to frequency hopping kernels of wireless devices, and more particularly to a method and apparatus implementing an overlay adaptive frequency hopping kernel in a wireless communication system.

2. Description of Related Art

Wireless communication systems facilitate high-speed connectivity and data and voice transport from point-to-point and point-to-multipoint bases. Exemplary wireless communication systems include "Bluetooth™ [1] protocol" systems that facilitate the transport of data between Bluetooth™ devices such as wireless headsets, cellular phones and personal digital assistants (PDAs). The Bluetooth™ protocol is a global specification standard for radio communications operating at 2.4 GHz radio frequencies. Bluetooth™ devices (i.e., those that comply with the Bluetooth™ Specification) replace normal cable connections using short-range radio links. Bluetooth™ protocol technology is featured in cordless telephony, intercom, FAX and LAN access, and dial-up networking applications. Bluetooth™ wireless communication protocols are implemented in wireless headsets, cellular phones, PDAs, printers, and other mobile devices. Bluetooth™ devices are described in more detail in a specification produced by the Bluetooth™ special interest group (SIG), entitled "Bluetooth™ Specification Version 1.1", electronically available to the public via the well-known Internet at <http://www.bluetooth.com>, published on Feb. 22, 2001, referred to herein as the "Bluetooth™ Specification", and incorporated by reference herein in its entirety for its teachings on Bluetooth™ flow control, signals, devices and communication protocols and schemes.

Bluetooth™ is a trademark of Bluetooth SIG, Inc.

Bluetooth™ devices typically communicate with other Bluetooth™ devices using either a "piconet" communication network topology or a "scatternet" communication network topology. Details regarding the Bluetooth™ communication protocols, piconet and scatternet communication networks are described in detail in the Bluetooth™ Specification. Specifically, the piconet networks are described in Section 1 of Part B of the Bluetooth™ Specification. The scatternet networks are described in Section 10.9 of Part B of the Bluetooth™ Specification.

A piconet is defined in the Bluetooth™ Specification as a communication system including two or more Bluetooth™ devices that share a common frequency hopping pattern and a common "Access Word" (or "access code"). Access codes are pre-defined bit patterns that are transmitted to a Bluetooth™ device at the beginning of "data packets." Access codes are used to provide device synchronization and identification. As defined in detail in section 4.1 of the Bluetooth™ Specification, data is communicated between Bluetooth™ devices in the form of data packets. The data packets have a pre-determined format defined by the Bluetooth™ Specification. As defined therein, a data packet includes an "access code", a "packet header" and a "payload" of data bits. Details regarding packets and access codes are described in more detail in Section 4.1–2 of the Bluetooth™ Specification.

At a minimum, a piconet comprises two or more Bluetooth™ devices, such as, for example, a portable PC and a cellular phone that communicate with each other via a piconet. A piconet can comprise a maximum of eight connected devices. When establishing a piconet, one and only one Bluetooth™ device acts as a master device. The master device initiates a connection to one or more slave devices. Any device in a piconet that is not a master device is, by definition, a slave device. Master-slave roles can be exchanged once a piconet is established. A master can become a slave, and a slave can become a master. Bluetooth™ master and slave devices utilize various Bluetooth™ protocols to exchange data.

Bluetooth™ wireless communication protocols aid in implementing various Bluetooth™ applications. Bluetooth™ applications utilize various links, or connections, to communicate between master and slave devices. As described in Part B, "Baseband Specification", Sections 2.1 and 11, of the Bluetooth™ Specification, Bluetooth™ communication systems use a frequency hopping (FH) spread spectrum (FHSS) scheme (referred to hereinafter as the "Bluetooth™ FH kernel") to communicate between master and slave devices. The term "frequency hopping spread spectrum scheme" refers to the well-known method of repeatedly switching channels or frequencies during data transmission. Frequency hopping spread spectrum schemes require channel switching or "hopping" to follow a specified algorithm so that devices can independently determine frequency-hopping (FH) sequences (i.e., ordered lists of frequencies).

Bluetooth™ communication protocols, as described in the aforementioned Part B, "Baseband Specification", Section 2.1, of the Bluetooth™ Specification, determine FH sequences by using the Bluetooth™ device address and clock of a master device so that associated slave devices on a piconet can independently determine the pseudo-random FH sequences. Although an FH sequence associated with a master device is unique, piconets within close proximity can interfere with one another due to the Bluetooth™ protocol using only 79 independent channels. The Bluetooth™ FH kernel reduces collisions between nearby Bluetooth™ piconets due to properties of the pseudo-random sequence. Bluetooth™ communication protocols use the Bluetooth™ FH kernel, as described in the aforementioned Part B, "Baseband Specification", Section 11, of the Bluetooth™ Specification, to select FH sequences and map FH sequences to hop frequencies.

Disadvantageously, the Bluetooth™ FH kernel selects hopping frequencies without regard to channel conditions, and thus, a hopping frequency having bad channel conditions (e.g., exhibiting small signal-to-noise ratios) caused by non-Bluetooth™ (FH) interferers can be selected. As is well known, transmitting data on frequencies with bad channel conditions increases the probability of the occurrence of reception errors. In any data communication system, it is desirable to reduce the occurrence of reception errors.

Therefore, a need exists for an adaptive frequency-hopping kernel that reduces reception errors in devices using frequency-hopping spread spectrum methods. Such a method should retain the pseudo-random properties of an original sequence. The method and apparatus should use channel conditions as an important criteria when determining frequency-hopping channels. The present invention provides such an adaptive frequency-hopping kernel.

SUMMARY OF THE INVENTION

The present invention is a method and apparatus implementing an overlay adaptive frequency-hopping kernel in a wireless communication system. The present inventive method and apparatus selects hopping frequencies based on channel conditions. In accordance with the present invention, hopping frequencies are selected by an inventive overlay adaptive frequency-hopping (OAFH) kernel that maps bad channels to good channels in such a manner that the pseudo-random properties of the re-mapped channels are similar to the original sequence.

The present inventive OAFH kernel uses existing FH kernels (e.g., Bluetooth™ FH kernels) to initially select hopping frequencies. If the initially selected hopping frequency has bad channel conditions, the OAFH kernel maps the initially selected hopping frequency to a substitute hopping frequency having good channel conditions. The present invention includes an OAFH kernel apparatus and method.

The OAFH kernel apparatus includes an initial frequency-hopping kernel and a channel-quality based frequency-hopping (CQB FH) kernel. The initial FH kernel determines hopping frequencies in any well-known manner. If the hopping frequencies selected by the initial FH kernel have bad channel quality, the CQB FH kernel maps the hopping frequencies to substitute hopping frequencies and outputs the substitute hopping frequencies.

The present inventive OAFH kernel method uses a two-stage process to select hopping frequencies having good channel qualities. The inventive two-stage process includes an initial selection stage and a channel quality-based selection stage. In the initial selection stage, a general-purpose FH kernel (e.g., a Bluetooth™ FH kernel) is used to initially select hopping frequencies. The general-purpose (GP) FH kernel can be any FH kernel that selects a FH sequence and maps the FH sequence into hopping frequencies. The GP FH kernel has certain properties associated with its pseudo-random sequence that can be used to reduce frequency collisions between similar FH devices. The channel quality-based (CQB) selection stage receives a selected hopping channel from the initial selection stage and outputs a hopping channel having good channel conditions. If the selected hopping channel has good channel conditions, the CQB selection stage outputs the selected hopping channel. If the selected hopping channel has bad channel conditions, the CQB selection stage maps the selected hopping channel to a substitute hopping channel and outputs the substitute hopping channel.

The present invention can be utilized with any wireless communication application that uses frequency-hopping spread spectrum schemes. The present invention is particularly useful in frequency-hopping spread spectrum schemes that select hopping frequencies regardless of channel conditions. The present invention reduces reception errors in devices using frequency-hopping spread spectrum methods while retaining the pseudo-random properties of the original frequency-hopping sequence.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations to the present invention.

The present invention is a method and apparatus implementing an overlay adaptive frequency-hopping kernel in a wireless communication system. The present inventive method and apparatus selects hopping frequencies based on channel conditions. In accordance with the present invention, hopping frequencies are selected by an inventive overlay adaptive frequency-hopping (OAFH) kernel that maps bad channels to good channels.

The present inventive OAFH kernel uses existing FH kernels (e.g., Bluetooth™ FH kernel) to initially select hopping frequencies. If the initially selected hopping frequency has bad channel conditions, the OAFH kernel maps the initially selected hopping frequency to a substitute hopping frequency having good channel conditions.

One of ordinary skill in the signal modulation art shall recognize that the present invention can be utilized with any wireless communication application that uses frequency-hopping modulation schemes without departing from the scope of the present invention. The present invention is particularly useful in frequency-hopping spread spectrum schemes that select hopping frequencies regardless of channel conditions. The present invention reduces reception errors in devices using frequency-hopping spread spectrum methods.

Exemplary Bluetooth™ Communication System Adapted for Use with the Present Invention The exemplary Bluetooth™ communication system described hereinbelow is described in greater detail in the Bluetooth™ Specification at Parts A, B, and C incorporated by reference hereinabove. One skilled in the communication art shall recognize that the described wireless communication system is exemplary only and therefore is not meant to be a limitation to the present invention. Different wireless communication systems can be used without departing from the scope or spirit of the present invention. Examples of wireless communication systems that can be utilized with the present invention include broadband wireless communication systems, cellular IP communication systems and satellite communication systems. The present invention can be used in many wireless communication systems where reduced reception error is desired. One exemplary Bluetooth™ communication system is now described with reference to FIG. 1.

Figure 1:
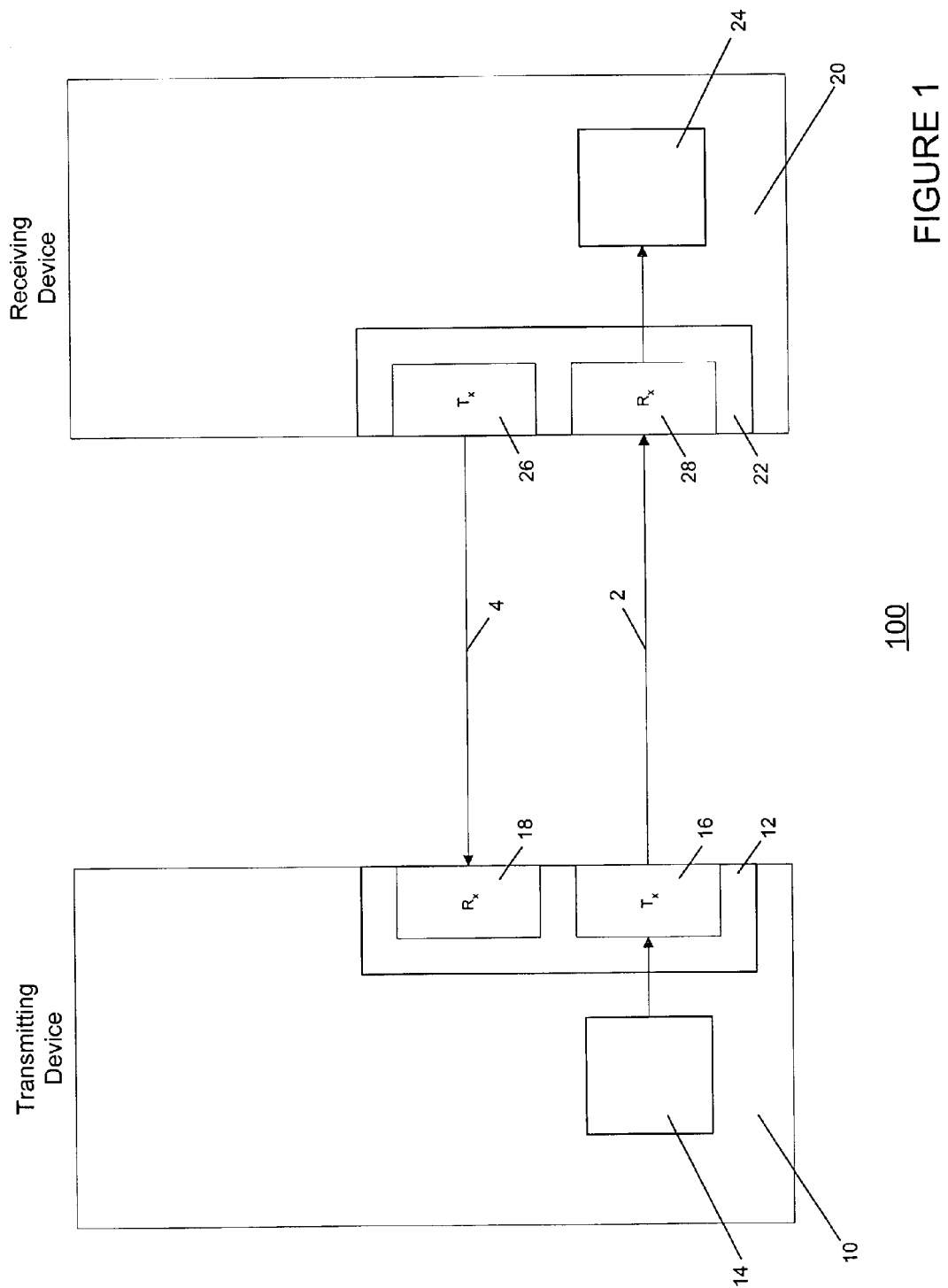
FIG. 1 is a block diagram showing an exemplary Bluetooth™ communication system.

FIG. 1 is a block diagram showing an exemplary Bluetooth™ communication system. As shown in FIG. 1, the exemplary Bluetooth™ communication system 100 comprises a transmitting device 10 and a receiving device 20. The transmitting device 10 transmits data to the receiving device 20 via a downlink 2. The receiving device 20 transmits data to the transmitting device 10 via an uplink 4. The transmitting device 10 includes a radio 12 and a first frequency-hopping kernel 14. The radio 12 includes a transmitter 16 and a receiver 18. The transmitter 16 is operatively coupled to communicate with the first frequency-hopping (FH) kernel 14. Data awaiting transmission is temporarily stored until the transmitter 16 is able to transmit the data to a receiver 28 in the receiver device 20 via the downlink 2. The first frequency-hopping (FH) kernel 14 selects FH sequences and maps FH sequences to hop frequencies. The first FH kernel 14 transmits frequency-hopping information to the transmitter 16 for use in transmitting data to the receiving device 20.

As shown in FIG. 1, the receiving device 20 includes a radio 22 and a second frequency-hopping kernel 24. The radio 22 includes a transmitter 26 and a receiver 28. The receiver 28 is operatively coupled to communicate with the second frequency-hopping kernel 24. The second FH kernel 24 transmits frequency-hopping information to the receiver 28 for use in receiving data from the transmitting device 10. Data received by the receiver 28 is stored until the receiving device 20 is able to process the data. Those skilled in the wireless communication art shall recognize that the receiving device 20 and the transmitting device 10 can comprise additional, or less, elements without departing from the scope of the present invention.

The radio 12 includes radio frequency circuits capable of creating RF transmit signals and receiving and down-converting RF received signals. The radio 12 also includes a modulator function that is capable of converting digital data packets to analog waveforms for encoding onto radio frequency signals. Similarly, the radio 12 includes a demodulator function that is capable of recovering digital data streams from the received signals. The transmitting device radio 12 is capable of transmitting downlink data packets to the receiving device radio 22 via the downlink 2. Similarly, the receiving device radio 22 is capable of transmitting uplink data packets to the transmitting device radio 12 via the uplink 4.

The first and second frequency-hopping kernels 14 and 24, respectively, provide a method of coordinating and controlling the transmission of data between the transmitting and receiving devices 10, and 20, respectively, in the exemplary Bluetooth™ communication system 100. The frequency-hopping kernels 14, 24 enable the transmitting device 10 and receiving device 20 to independently determine frequency-hopping (FH) sequences. In accordance with the Bluetooth™ Specification, Bluetooth™ communication protocols determine FH sequences by using the Bluetooth™ device address and clock of a master device.

Those skilled in the wireless communication art shall recognize that various frequency-hopping kernels can be used without departing from the scope or spirit of the present invention. For example, several Bluetooth™ frequency-hopping kernels (e.g., 79-channel hopping kernel and a 23-channel hopping kernel) that can be used with the present invention are described in the aforementioned Part B, "Baseband Specification", Section 11, of the Bluetooth™ Specification. An exemplary Bluetooth™ 79-channel hopping kernel is described below with reference to FIGS. 2*a* and 2*b*.

Figure 2A:
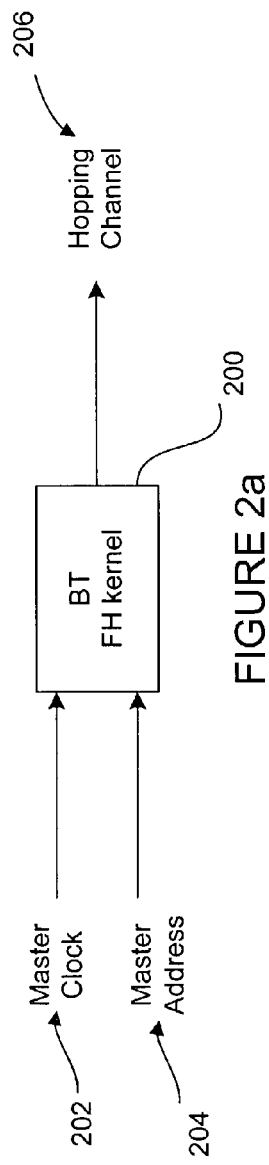
FIG. 2*a* is a block representation of an exemplary Bluetooth™ FH kernel.

FIG. 2*a* is a simplified block representation of an exemplary Bluetooth™ FH kernel. As shown in FIG. 2*a*, the Bluetooth™ FH kernel 200 inputs a master clock signal 202 and a master address signal 204. The Bluetooth™ FH kernel 200 selects hopping frequencies according to a predetermined algorithm based on the master clock signal 202 and the master address signal 204. The Bluetooth™ FH kernel 200 outputs selected hopping frequencies or hopping channels 206.

Figure 2B:
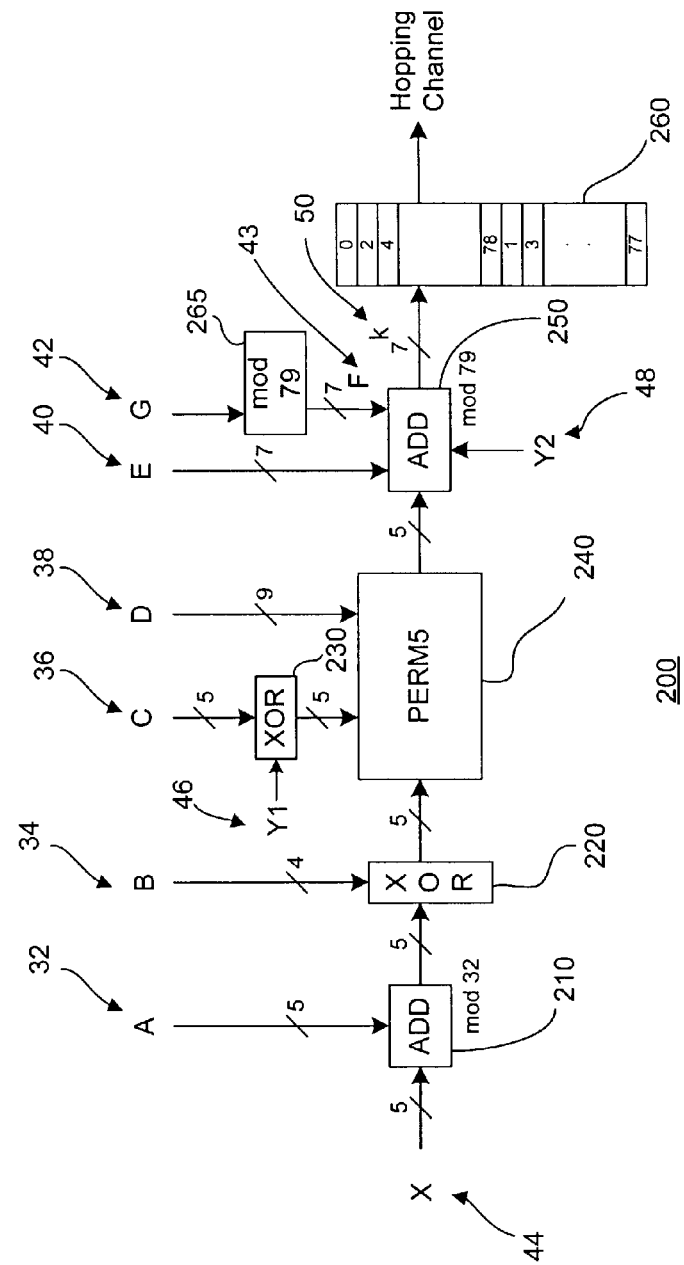
FIG. 2*b* is a block diagram of the exemplary Bluetooth™ FH kernel of FIG. 2*a*.

FIG. 2*b* is a more detailed block diagram of the exemplary Bluetooth™ FH kernel of FIG. 2*a*. As shown in FIG. 2*b*, the Bluetooth™ FH kernel 200 comprises a first adder 210, a first XOR gate 220, a second XOR gate 230, a permutator 240, a second adder 250, a first mod 79 divider 265, and a register bank 260. The FH kernel 200 receives the inputs A 32, B 34, C 36, D 38, E 40, G 42, X 44, Y1 46 and Y2 48 as shown in FIG. 2*b*. As described in Part B, section 11.3 (tables 11.3 and 11.4) of the incorporated Bluetooth™ specification, the aforementioned inputs to the FH kernel 200 are derived from the master clock signal 202 and the master address signal 204 (FIG. 2*a*).

The first adder 210 receives and sums the inputs A 32 (5 bits) and X 44 (5 bits) to produce a resulting sum. The first adder 210 performs the well-known modulo 32 operation on the resulting sum to produce a 5-bit output. Modulo is a mathematical operation that yields the remainder of a division operation. For example, 67 modulo 32 yields 3 because 67 divided by 32 yields a remainder of 3. The first adder 210 inputs the 5-bit output to the first XOR 220. The operation of the first adder 210 is described in greater detail in Part B, section 11.2.1 of the incorporated Bluetooth™ specification.

The first XOR 220 receives the 5-bit output from the first adder 210 and the B 34 (4 bits). The first XOR 220 performs the well-known XOR operation to produce a 5-bit output. The first XOR 220 inputs the 5-bit output to the permutator 240. The operation of the first XOR 220 is described in greater detail in Part B, section 11.2.2 of the incorporated Bluetooth™ specification.

The second XOR 230 receives the inputs Y1 46 and C 36 (5 bits). The second XOR 230 performs the well-known XOR operation to produce a 5-bit output. The second XOR 230 inputs the 5-bit output to the permutator 240. The permutator 240 receives the 5-bit output from the first XOR 220, the 5-bit output from the second XOR 230 and from D 38 (9 bits). The permutator pseudo-randomly changes the bit positions and values of the 5-bit input based on a 14-bit control word formed by the 5-bit output of the second XOR 230 and the 9-bit value of D 38. The permutator 240 inputs a 5-bit output to the adder 250. The operation of the second XOR 230 and of the permutator 240 is described in greater detail in Part B, section 11.2.3 of the incorporated Bluetooth™ specification.

The first mod 79 divider 265 receives the input G 42 and divides it by 79 resulting in F 43. The second adder 250 receives and sums the 5-bit output from the inputs E 40 (7 bits), F 43 (7 bits), Y2 48 and the permutator 240 to produce a resulting sum. The second adder 250 performs the well-known modulo 79 operation on the resulting sum to produce an output K 50 (7 bits). The adder 250 inputs the K 50 to the register bank 260. The operation of the second adder 250 is described in greater detail in Part B, section 11.2.4 of the incorporated Bluetooth™ specification.

The register bank 260 comprises 79 registers, wherein even frequencies are loaded above odd frequencies. The registers are loaded with synthesizer code words corresponding to hopping frequencies. The register bank 260 receives and uses the K 50 to select or address one of the 79 registers of the register bank 260. The synthesizer code word corresponding to the selected register represents a hopping channel. The exemplary Bluetooth™ FH kernel outputs synthesizer code word or hopping channels 206 (FIG. 2*a*)

for further processing in devices such as the transmitter 16 and the receiver 28 (FIG. 1). The operation of the register bank 260 is described in greater detail in Part B, section 11.2.4 of the incorporated Bluetooth™ specification. The register bank 260 contains values corresponding to the synthesizer control word for the given channel, 0 through 78, where the mapping from the channel to frequency is represented by the following equation: frequency=2402+k MHz. These values may be loaded by software or pre-loaded into hardware.

Those skilled in the communication art shall recognize that the Bluetooth™ FH kernel 200 of FIGS. 2*a* and 2*b* is exemplary only and that different FH kernels that select a FH sequence and map the FH sequence onto hopping frequencies can be used with the present invention without departing from its scope or spirit. The present inventive method and apparatus is now described in more detail with reference to FIGS. 3*a*, 3*b*, 3*c* and 4–6.

Overlay Adaptive Frequency-Hopping (OAFH) Kernel Apparatus

The OAFH kernel apparatus includes an initial frequency-hopping kernel and a "channel-quality based" frequency-hopping (CQB FH) kernel. The initial FH kernel determines hopping frequencies in any well-known manner such as the manner in which hopping frequencies are determined by the exemplary Bluetooth™ FH kernel 200 described above with reference to FIGS. 2*a* and 2*b*. If the hopping frequencies selected by the initial FH kernel are determined to have bad channel quality characteristics, the CQB FH kernel maps the hopping frequencies to substitute hopping frequencies and outputs the substitute hopping frequencies.

Figure 3A:
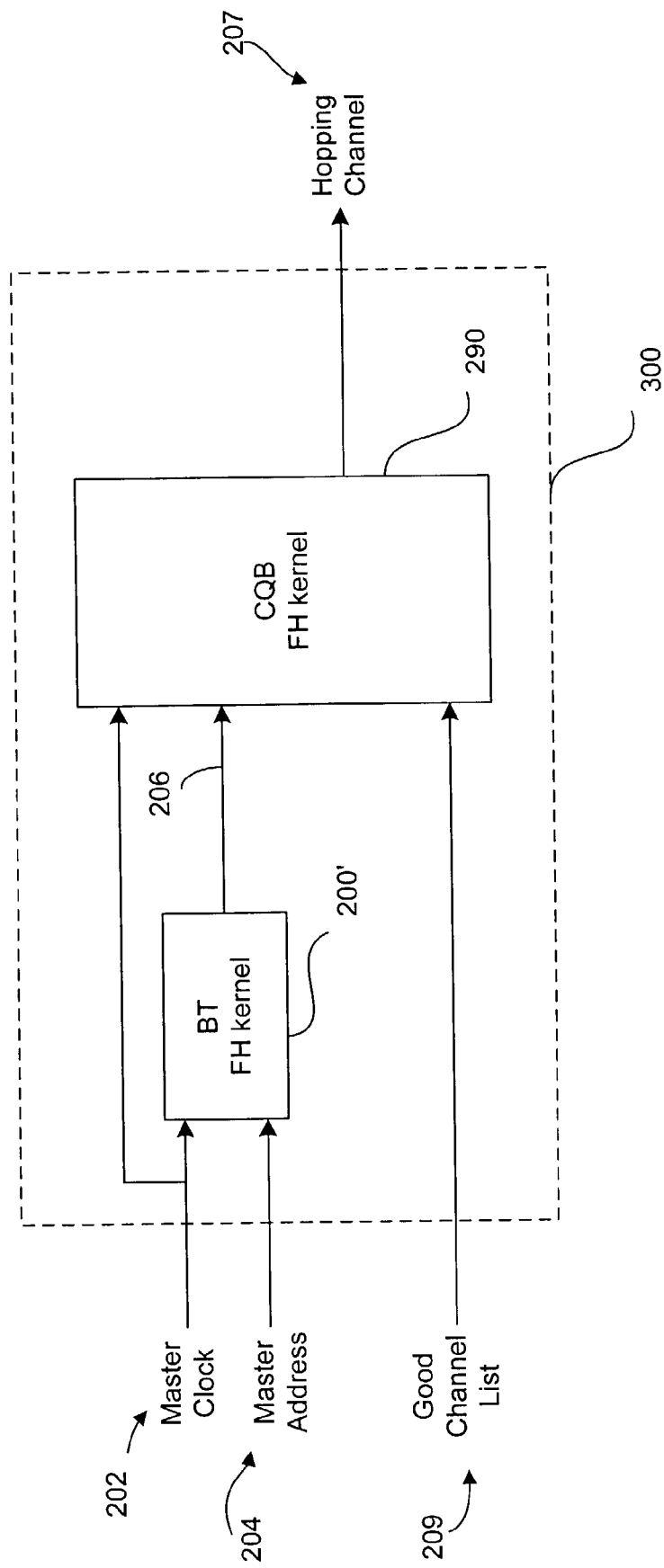
FIG. 3*a* is a block representation of a first embodiment of the overlay adaptive frequency-hopping (OAFH) kernel.

FIG. 3*a* is a simplified block representation of a first embodiment of the overlay adaptive frequency-hopping (OAFH) kernel in accordance with the present invention. As shown in FIG. 3*a*, the OAFH kernel 300 receives a good channel list 209, a master clock signal 202 and a master address signal 204. The OAFH kernel 300 selects hopping frequencies according to a predetermined algorithm based on these aforementioned inputs. The OAFH kernel 300 outputs the selected hopping frequencies (or channels) 207.

As shown in FIG. 3*a*, the OAFH kernel 300 includes a Bluetooth™ FH kernel 200' and a channel-quality based (CQB) FH kernel 290. The Bluetooth™ FH kernel 200' can be an FH kernel that selects an FH sequence and maps the FH sequence onto hopping frequencies. For example, in one embodiment of the present invention the Bluetooth™ FH kernel 200' comprises the exemplary Bluetooth™ FH kernel 200 described above with reference to FIG. 2*b*.

The Bluetooth™ FH kernel 200' receives the master clock signal 202 and master address signal 204. The Bluetooth™ FH kernel 200' determines hopping channels 206 and inputs them to the CQB FH kernel 290. The CQB FH kernel 290 receives the hopping channels 206, the master clock signal 202 and the good channel list 209 and outputs the hopping channels 207. A second embodiment of the OAFH kernel is now described with reference to FIG. 3*b*.

The second embodiment of the OAFH kernel includes an initial FH kernel and a CQB FH kernel. In the second embodiment, the initial FH kernel and the CQB FH kernel are described as using common elements. However, this is not meant to limit the present invention. The initial FH kernel and the CQB FH kernel can use separate components without departing from the scope of the present invention.

Figure 3B:
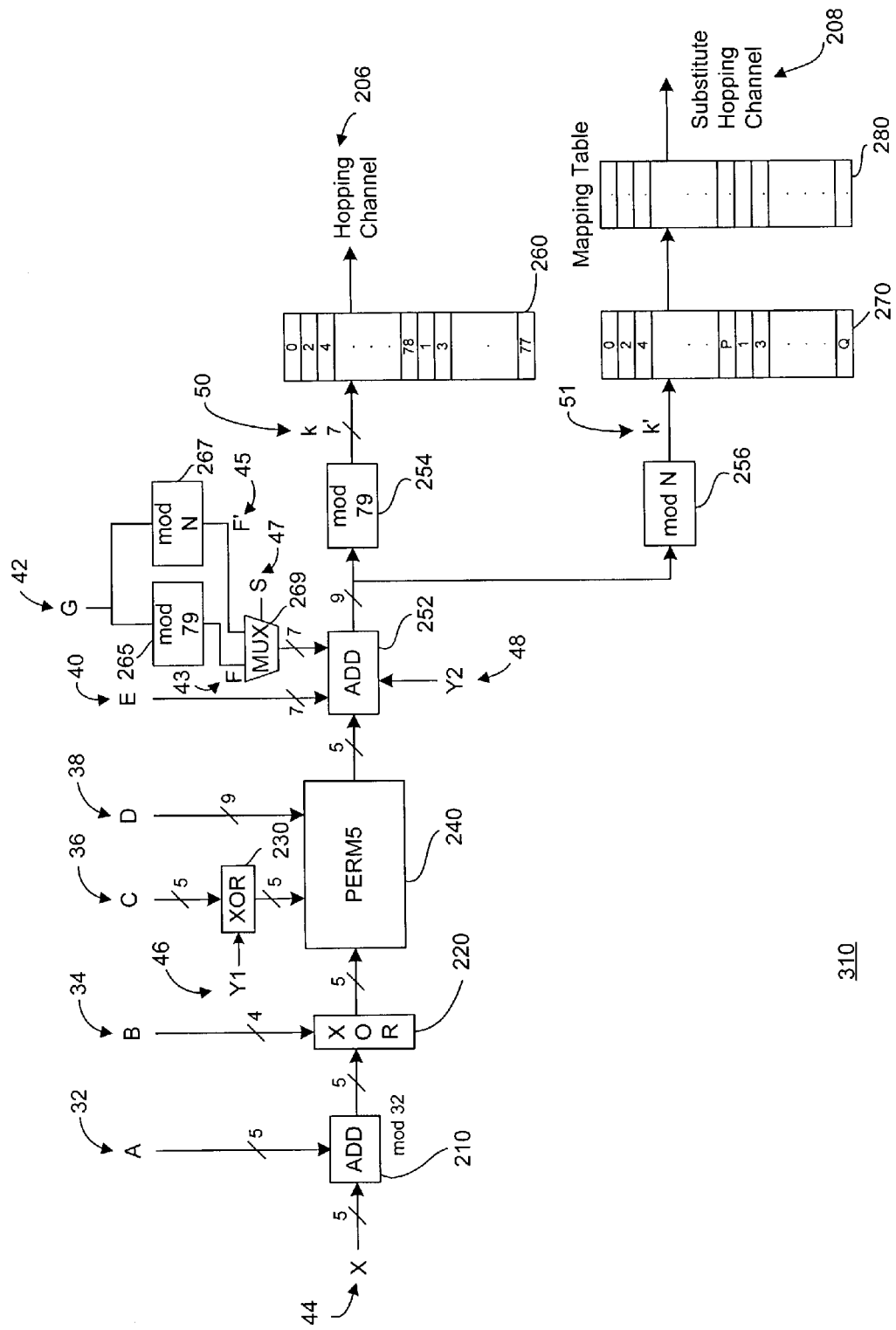
FIG. 3*b* is a block diagram of a second embodiment of the OAFH kernel.

FIG. 3*b* is a block diagram of a second embodiment of the OAFH kernel made in accordance with the present invention. As shown in FIG. 3*b*, the second embodiment of the OAFH kernel 310 includes a first adder 210, a first XOR gate 220, a second XOR gate 230, a permutator 240, a second adder 252, a first mod 79 divider 265, a first mod N divider 267, a MUX 269, a first register bank 260, a second mod 79 divider 254, a second mod N divider 256, a second register bank 270 and a mapping table 280. The OAFH kernel 310 receives inputs A 32, B 34, C 36, D 38, E 40, G 42, X 44, Y1 46, Y2 48 and S 47. The second embodiment of the OAFH kernel 310 is similar to the Bluetooth™ FH kernel 200' described above, and thus similar elements are not described in detail hereinbelow.

The initial FH kernel includes the first adder 210, the first XOR gate 220, the second XOR gate 230, the permutator 240, the second adder 252, the second mod 79 divider 254, the first register bank 260 and a selection device (not shown in FIG. 3*b*). The selection device is described in detail below with reference to FIG. 4. The initial FH kernel receives the inputs A 32, B 34, C 36, D 38, E 40, G 42, X 44, Y1 46, Y2 48 and S 47. The S 47 is the select input to the mux 269. When S 47 is set to 0 the output of the mux 269 is F 43. When S 47 is set to 1 the output of the mux 269 is F' 45. The initial FH kernel operates in a substantially identical manner to the above-described Bluetooth™ FH kernel 200 with S 47 is set to 0.

The CQB FH kernel includes the first adder 210, the first XOR gate 220, the second XOR gate 230, the permutator 240, the second adder 252, the first mod N divider 267, the second mod N divider 256, the second register bank 270 and the mapping table 280. The CQB FH kernel receives the inputs A 32, B 34, C 36, D 38, E 40, G 42, X 44, Y1 46, Y2 48 and S 47. The CQB FH kernel operates in a substantially identical manner to the above-described Bluetooth™ FH kernel 200 with S 47 set to 1.

The second adder 252 receives the 5-bit output from the permutator 240, E 40 (7 bits), the output of the mux 269 (7 bits), and Y2 48. When operating in the initial FH kernel mode, the second adder 252 sums the 5-bit output from the permutator 240, with E 40 (7 bits), F 43 (7 bits), and Y2 48, to produce a 9-bit resultant sum. The second adder 252 inputs the 9-bit resultant sum to the second mod 79 divider 254. The second mod 79 divider 254 performs the well-known modulo 79 operation on the 9-bit resultant sum to produce an output K 50 of 7 bits. The second mod 79 divider 254 inputs the K 50 output to the first register bank 260. The first register bank 260 receives and uses the K 50 output to select or address one of 79 registers in the first register bank 260. The register bank 260 contains values corresponding to the synthesizer control word for the given channel, 0 through 78, where the mapping from the channel to frequency is represented by the following equation: frequency=2402+k MHz. These values may be loaded by software or pre-loaded into hardware. The OAFH kernel outputs synthesizer code words or hopping frequencies 206 for further processing by devices such as the transmitter 16 and the receiver 28 (FIG. 1).

When operating in a CQB FH kernel mode, the second adder 252 sums the 5-bit output received from the permutator 240, with the inputs E 40 (7 bits), F' 45 (7 bits), and Y2 48 to produce a 9-bit resulting sum. The second adder 252 inputs the 9-bit resulting sum to the second mod N divider 256. The second mod N divider 256 performs a modulo N operation on the 9-bit resulting sum to produce an output K' 51, where N is a number of available channels. The second mod N divider 256 accepts the input K' 51 to the second register bank 270. The second register bank 270 receives and uses the input K' 51 to select or address one of the 79 registers of the second register bank 270. The N values in register bank 270 are ordered with all even numbers first followed by all of the odd numbers up to N-1. Only N-1 entries in the register bank are used. For example, for N=7 register bank 270 would contain the values 0, 2, 4, 6, 1, 3, 5, 7 in that order. The second register bank 270 inputs a hopping channel to the mapping table 280. The mapping table 280 receives the hopping channel and maps it to a substitute hopping channel 208. The mapping table 280 contains all of the good frequencies (as determined by the Good Channel List 209) in increasing order. The OAFH kernel outputs the substitute hopping frequencies 208 for further processing by devices such as the transmitter 16 and the receiver 28 (FIG. 1).

Figure 3C:
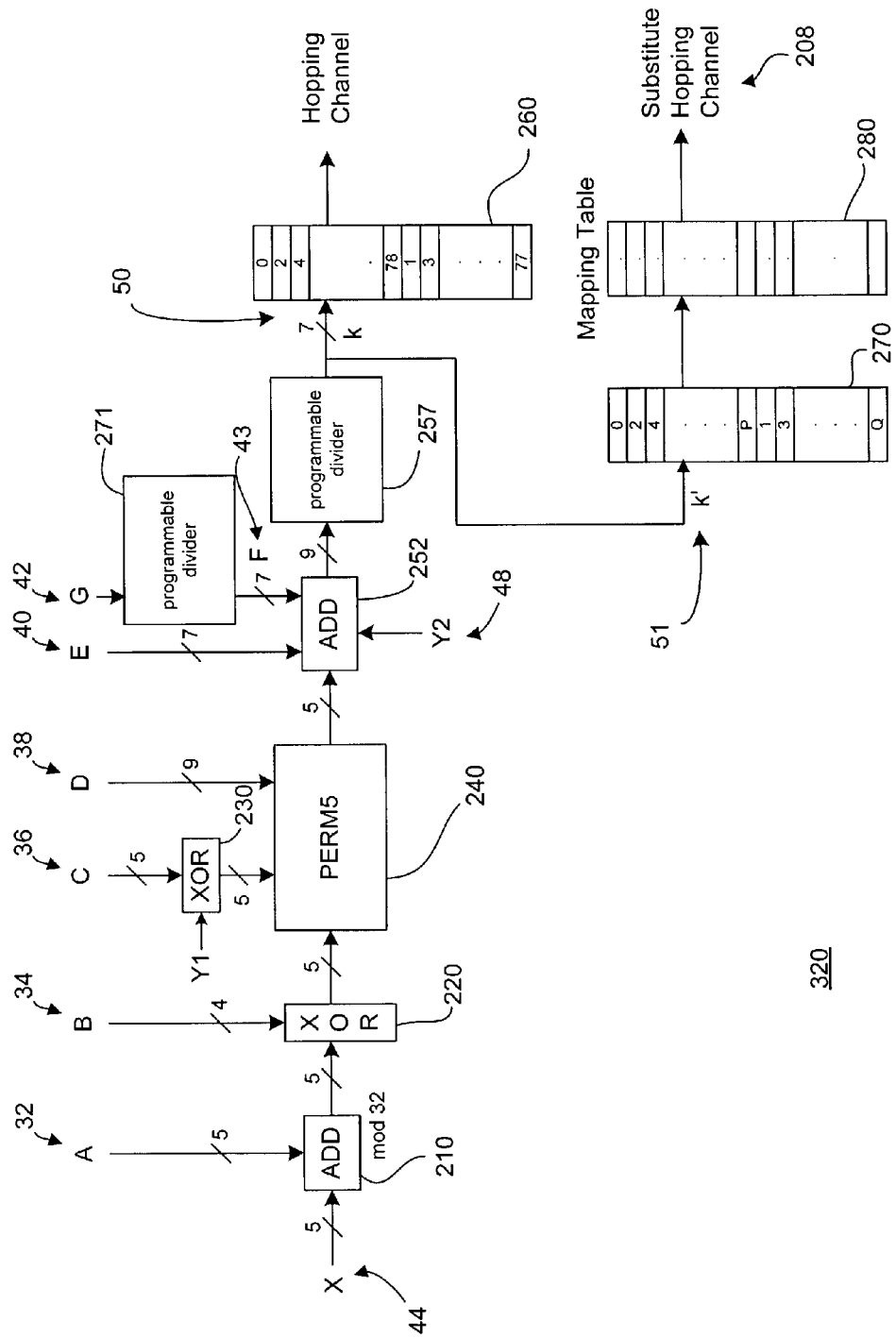
FIG. 3*c* is a block diagram of a third embodiment of the OAFH kernel.

FIG. 3c is a block diagram of a third embodiment of the OAFH kernel. As shown in FIG. 3c, the third embodiment of the OAFH kernel 320 includes a first adder 210, a first XOR gate 220, a second XOR gate 230, a permutator 240, a second adder 252, a first programmable divider 271, a first register bank 260, a second programmable divider 257, a second register bank 270 and a mapping table 280. The OAFH kernel 320 receives the inputs A 32, B 34, C 36, D 38, E 40, G 42, X 44, Y1 46 and Y2 48. When operating in the initial FH kernel mode, the first programmable divider 271 performs a modulo 79 operation. The third embodiment of the OAFH kernel 320 is similar to the second embodiment of the OAFH kernel 310, and thus similar elements are not described in detail hereinbelow.

The initial FH kernel includes the first adder 210, the first XOR gate 220, the second XOR gate 230, the permutator 240, the second adder 252, the programmable divider 257, the first register bank 260 and a selection device (not shown in FIG. 3b). The selection device is described in detail below with reference to FIG. 4. The initial FH kernel receives the inputs A 32, B 34, C 36, D 38, E 40, G 42, X 44, Y1 46 and Y2 48. The initial FH kernel operates in a substantially identical manner to the above-described initial FH kernel of the second embodiment 310 (described above with reference to FIG. 3b).

The CQB FH kernel includes the first adder 210, the first XOR gate 220, the second XOR gate 230, the permutator 240, the first programmable divider 271, the second adder 252, the second programmable divider 257, the second register bank 270 and the mapping table 280. The CQB FH kernel receives the inputs A 32, B 34, C 36, D 38, E 40, G 42, X 44, Y1 46 and Y2 48. When operating in the CQB mode, the first programmable divider 271 performs a modulo N operation. The CQB FH kernel operates in a substantially identical manner to the above-described CQB FH kernel of the second embodiment 310 (described above with reference to FIG. 3b).

As shown in FIG. 3c, the second adder 252 inputs the 9-bit resulting sum to the programmable divider 257. The programmable divider 257 performs the well-known modulo operation on the 9-bit resulting sum to produce an output K 50 (7 bits) or an output K' 51 (7 bits). The type of modulo operation performed depends on whether the programmable divider 257 is operating in an initial FH kernel mode or a CQB FH kernel mode.

When operating in the initial FH kernel mode, the programmable divider 257 performs a modulo 79 operation. The programmable divider 257 inputs the output K 50 to the first register bank 260. The first register bank 260 receives and uses the output K 50 to select or address one of the 79 registers within the register bank 260. The OAFH kernel outputs synthesizer code words (or hopping frequencies) 206 for further processing in devices such as the transmitter 16 and the receiver 28 (FIG. 1).

When operating in the CQB FH kernel mode, the programmable divider 257 performs a modulo N operation, wherein N is a number of available channels. The divider 257 inputs the output K' 51 to the second register bank 270. The second register bank 270 receives and uses the output K' 51 to select or address one of the 79 registers of the register bank 270. The N values in register bank 270 are ordered with all even numbers first followed by all of the odd numbers up to N-1. Only N-1 entries in the register bank are used. For example, for N=7 register bank 270 would contain the values 0, 2, 4, 6, 1, 3, 5, 7 in that order. The register bank 270 inputs a hopping channel to the mapping table 280. The mapping table 280 receives the hopping channel and maps it to a substitute hopping channel 208. The OAFH kernel outputs the substitute hopping frequencies 208 for further processing by devices such as the transmitter 16 and the receiver 28 (FIG. 1).

In one embodiment, the OAFH kernel outputs selected hopping frequencies (i.e., the hopping frequencies 206 and the substitute hopping frequencies 208) using a selection device. Those skilled in the communication art shall recognize that any convenient selection device can be used with the present invention without departing from the scope of the present invention. An exemplary selection device is now described with reference to FIG. 4.

Figure 4:
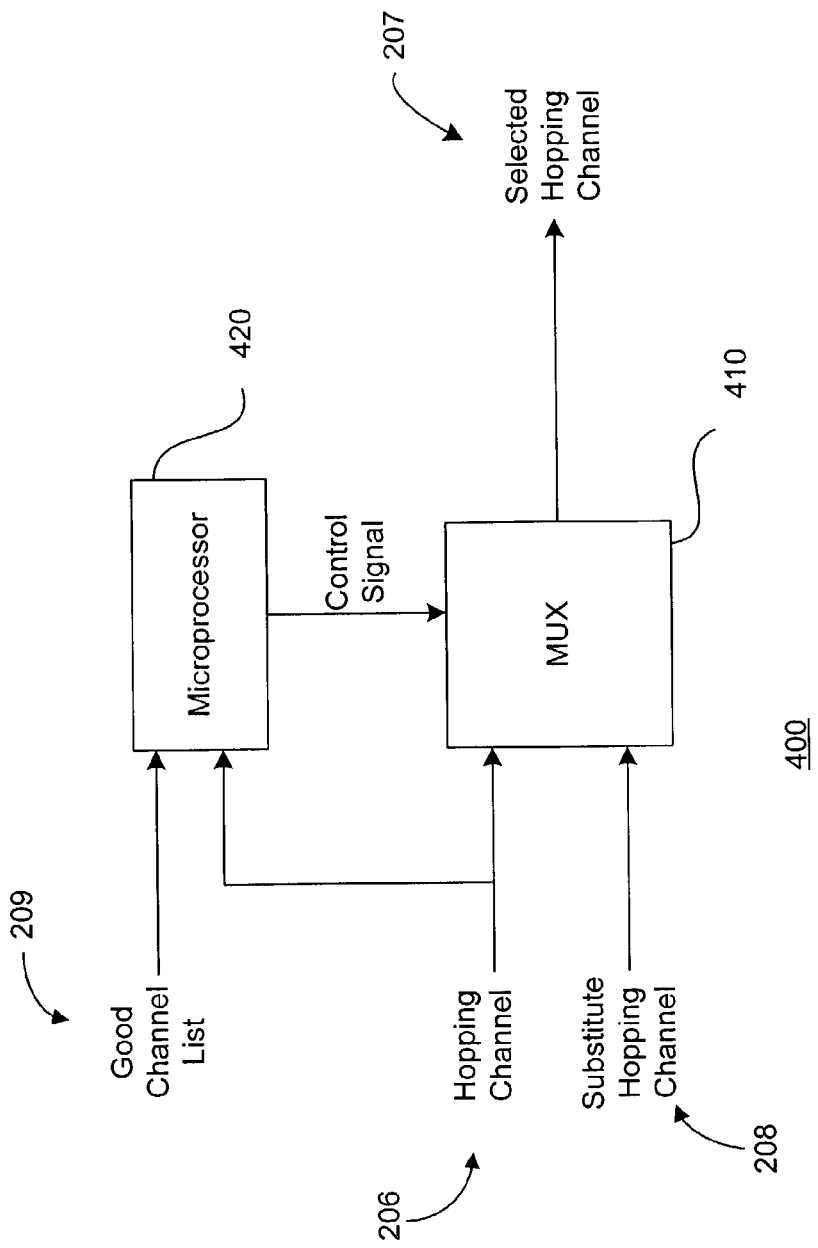
FIG. 4 is a block diagram of an exemplary selection device.

FIG. 4 is a block diagram of an exemplary selection device for use with the present invention. As shown in FIG. 4, the exemplary selection device 400 includes a multiplexer 410 and a microprocessor 420. The exemplary selection device receives the good channel list 209, the hopping channel 206 and the substitute hopping channel 208. The multiplexer (MUX) 410 receives the hopping channel 206, the substitute hopping channel 208 and a control signal from the microprocessor 420. Depending upon the state of the control signal, the MUX 410 outputs either the hopping channel 206 or the substitute hopping channel 208. The microprocessor 420 therefore controls the output of the MUX 410 (i.e., the selected hopping channel 207).

As shown in FIG. 4, the good channel list 209 and the hopping channel 206 are input to the microprocessor 420. The good channel list 209 includes the available frequencies that have good channel quality characteristics. The microprocessor 420 determines whether the hopping channel 206 corresponds to a hopping channel on the good channel list 209. If the hopping channel 206 corresponds to a hopping channel on the good channel list 209, the microprocessor 420 transmits a control signal to the MUX 410 that selects the hopping channel 206 as the selected hopping channel 207. Otherwise, the microprocessor 420 transmits a control signal to the MUX 410 that selects the substitute hopping channel 208 as the selected hopping channel 207.

Those skilled in the computer design art shall recognize that the 400 described and shown in FIG. 4 selection device is exemplary only and other selection methods can be used without departing from the scope of the present invention. For example, the microprocessor can be replaced with a look-up table.

Overlay Adaptive Frequency-Hopping (OAFH) Kernel Method

The OAFH kernel apparatus described above with reference to FIGS. 2a, 2b and 3a–3c, can be utilized with the OAFH kernel method described below with reference to FIGS. 5 and 6. The present inventive OAFH kernel method reduces the probability of data transmission/reception errors in wireless communication systems. The present inventive method is now described.

The present inventive OAFH kernel method uses a two-stage process to select hopping frequencies having good channel quality characteristics. The inventive two-stage process includes an initial selection stage and a channel quality-based selection stage. In the initial selection stage, a general-purpose FH kernel (e.g., a Bluetooth™ FH kernel) is used to initially select hopping frequencies. The general-purpose (GP) FH kernel can be an FH kernel that selects an FH sequence and maps the FH sequence onto hopping frequencies. The channel quality-based (CQB) selection stage receives a selected hopping channel from the initial selection stage and outputs a hopping channel having good channel condition characteristics. If the selected hopping channel has good channel condition characteristics, the CQB selection stage outputs the selected hopping channel. If the selected hopping channel has bad channel condition characteristics; the CQB selection stage maps the selected hopping channel to a substitute hopping channel and outputs the substitute hopping channel.

Figure 5:
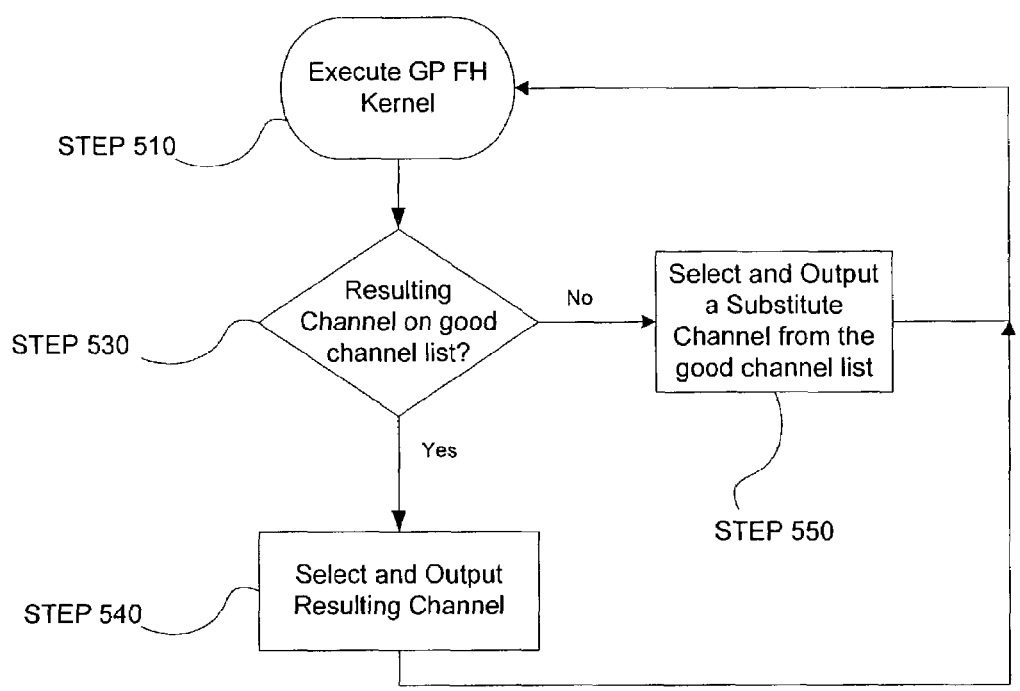
FIG. 5 is a flowchart of the present OAFH kernel method.

FIG. 5 is a flowchart of the present OAFH kernel method. As shown in FIG. 5, the present OAFH kernel method 500 includes STEPS 510, 530, 540 and 550. The initial selection stage includes the STEP 510. The CQB selection stage includes the STEPS 530, 540 and 550. The OAFH kernel method 500 begins at the STEP 510 whereat the method 500 executes a GP FH kernel such as the above-described Bluetooth™ FH kernel 200, which outputs a resulting channel.

After the STEP 510, the method 500 proceeds to a decision STEP 530 whereat the method 500 determines whether the resulting channel is presently on a good channel list. The good channel list is a list of the available frequencies that have good channel quality characteristics. If the method 500 determines that the resulting channel is on the good channel list, the method 500 proceeds to a STEP 540 whereat the method 500 selects and outputs the resulting channel. Otherwise, the method 500 proceeds to a STEP 550 whereat the method 500 selects and outputs a substitute channel from the good channel list. After the STEPS 540 and 550, the method 500 returns to the STEP 510.

Figure 6:
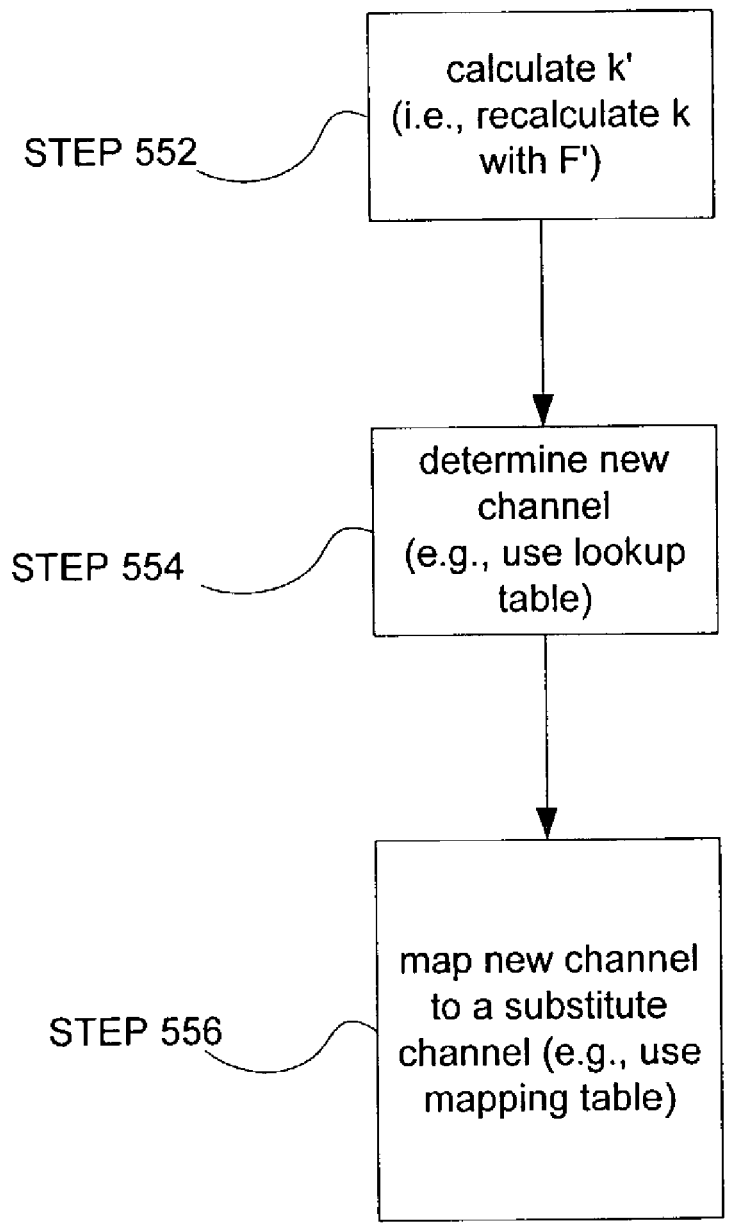
FIG. 6 is a flowchart of one embodiment of the STEP 550 of FIG. 5.

FIG. 6 is a flowchart of one embodiment of the selecting STEP 550 of FIG. 5. As shown in FIG. 6, the STEP 550 of the method 500 includes STEPS 552, 554 and 556. The STEP 550 begins at a STEP 552 whereat the method calculates an output k' (i.e., the method recalculates the output k of the GP FH kernel using F' instead of F (see FIG. 3b)). In one embodiment, all values of the GP FH kernel are maintained except for the F value, which is substituted by F', and the method recalculates the value of k (i.e., it calculates k').

After the STEP 552, the method proceeds to a STEP 554 whereat the method determines a new channel. In one embodiment, a mapping table or lookup table is used to determine the new channel. In another embodiment, a mapping algorithm is used to determine the new channel.

After the STEP 554, the method proceeds to a STEP 556 whereat the method maps the new channel to a substitute channel. In one embodiment, a mapping table is used to map the new channel to the substitute channel.

SUMMARY

In summary, the present invention is a novel method and apparatus for implementing an overlay adaptive frequency-hopping kernel in a wireless communication system. The present inventive method and apparatus selects hopping frequencies based on channel conditions. In accordance with the present invention, hopping frequencies are selected using an inventive overlay adaptive frequency-hopping (OAFH) kernel that maps "bad" channels to "good" channels.

The present inventive OAFH kernel uses existing FH kernels (e.g., the Bluetooth™ FH kernel) to initially select hopping frequencies. If the initially selected hopping frequency has bad channel condition characteristics, the OAFH kernel maps the initially selected hopping frequency to a substitute hopping frequency having good channel condition characteristics. The present invention is particularly useful in frequency-hopping spread spectrum schemes that select hopping frequencies regardless of channel conditions.

A number of embodiments of the present invention have been described. Nevertheless, it will be understood that various modifications may be made without departing from the spirit and scope of the invention. For example, the present inventive method and apparatus can be utilized with virtually any wireless communication application that uses frequency-hopping spread spectrum schemes.

In addition, although examples of the present invention have been described in the context of Bluetooth™ devices, the present invention can be used to implement any device that uses point-to-point and point-to-multipoint connections. Accordingly, it is to be understood that the invention is not to be limited by the specific illustrated embodiments, but only by the scope of the appended claims.

What is claimed is:

1. An overlay adaptive frequency hopping apparatus for use in a point-to-point connection of a wireless communication system, wherein the communication system comprises at least one master device and at least one slave device, and wherein the communication system is capable of utilizing point-to-point and point-to-multipoint connections, comprising:
   (a) an initial frequency hopping kernel that determines an initial frequency hopping channel based on a predetermined input; and
   (b) a channel-quality based frequency hopping kernel, operatively coupled to the initial frequency hopping kernel, wherein the channel-quality based frequency hopping kernel determines whether the initial frequency hopping channel has good channel quality characteristics, and wherein the channel-quality based frequency hopping kernel selects a substitute frequency hopping channel if the initial frequency hopping channel does not have good channel quality characteristics;
   wherein the initial frequency hopping kernel comprises a Bluetooth™ frequency hopping kernel and the channel-quality based frequency hopping kernel selects a substitute frequency hopping channel based on a master clock and a master address.

2. An overlay adaptive frequency hopping apparatus for use in a point-to-point connection of a wireless communication system, wherein the communication system comprises at least one master device and at least one slave device, and wherein the communication system is capable of utilizing point-to-point and Point-to-multipoint connections, comprising:
   (a) an initial frequency hopping kernel that determines an initial frequency hopping channel based on a predetermined input; and
   (b) a channel-quality based frequency, hopping kernel, operatively coupled to the initial frequency hopping kernel, wherein the channel-quality based frequency hopping kernel determines whether the initial frequency hopping channel has good channel quality characteristics, and wherein the channel-quality based frequency hopping kernel selects a substitute frequency hopping channel if the initial frequency hopping channel does not have good channel quality characteristics;
   wherein the initial frequency hopping kernel comprises:
   a first adder, operatively coupled to an input A and an input X, wherein the first adder sums the inputs A and X and generates a modulo M resultant;
   a first XOR device, operatively coupled to the first adder and an input B, wherein the first XOR device performs an XOR operation on the input B and the modulo M resultant and generates a first XOR resultant;

a second XOR device, operatively coupled to an input C and an input Y1, wherein the second XOR device performs an XOR operation on the inputs C and Y1 and generates a second XOR resultant;

a permutator, operatively coupled to a D input and the first and second XOR devices, wherein the permutator permutes the D input, the first XOR resultant and the second XOR resultant to produce a permutated resultant;

a first mod divider, operatively coupled to a G input, wherein the first mod divider performs a predetermined modulo operation on the G input to produce an F output;

a second adder, operatively coupled to an E input, the F output, a Y2 input and the permutator, wherein the second adder sums the E input, the F output, the Y2 input and the permutated resultant to produce a second adder resultant;

a second mod divider, operatively coupled to the second adder resultant, wherein the second mod divider performs a modulo operation on the second adder resultant to produce a K resultant; and a register bank, operatively coupled to the second mod divider, capable of selecting an address register based on the K resultant, wherein the register bank generates the initial frequency hopping channel.

3. The apparatus of claim 2, wherein the channel-quality based frequency hopping kernel comprises:

(a) the first adder as recited in claim 2;
(b) the first XOR device as recited in claim 2;
(c) the second XOR device as recited in claim 2;
(d) the permutator as recited in claim 2;
(e) a third mod divider, operatively coupled to the G input, wherein the third mod divider performs a predetermined modulo operation on the G input to produce an F' output;
(f) the second adder as recited in claim 2, operatively coupled to the E input, the F' output, the Y2 input and the permutator, wherein the second adder sums the E input, the F' output, the Y2 input and the permutated resultant to produce an alternate second adder resultant;
(g) a fourth mod divider, operatively coupled to the alternate second adder resultant, wherein the fourth mod divider performs a modulo operation on the alternate second adder resultant to produce a K' resultant;
(h) a second register bank, operatively coupled to the fourth mod divider, capable of selecting an address register based on the K' resultant, and capable of outputting an alternate hopping channel; and
(i) a mapping table, operatively coupled to the register bank, capable of mapping the alternate hopping channel to a substitute hopping channel, and capable of outputting the substitute hopping channel.

4. An overlay adaptive frequency hopping apparatus for use in a point-to-point connection of a wireless communication system, wherein the communication system comprises at least one master device and at least one slave device, and wherein the communication system is capable of utilizing point-to-point and point-to-multipoint connections, comprising:

(a) an initial frequency hopping kernel that determines an initial frequency hopping channel based on a predetermined input; and
(b) a channel-quality based frequency hopping kernel, operatively coupled to the initial frequency hopping kernel, wherein the channel-quality based frequency hopping kernel determines whether the initial frequency hopping channel has good channel quality characteristics, and wherein the channel-quality based frequency hopping kernel selects a substitute frequency hopping channel if the initial frequency hopping channel does not have good channel quality characteristics;

wherein the initial frequency hopping kernel comprises:

a first adder, operatively coupled to an input A and an input X, capable of summing the inputs A and X and generating a modulo M resultant;

a first XOR device, operatively coupled to the first adder and an input B, capable of performing an XOR operation on the input B and the modulo M resultant to generate and output a first XOR resultant;

a second XOR device, operatively coupled to an input C and an input Y1, capable of performing an XOR operation on the inputs C and Y1 to generate and output a second XOR resultant;

a permutator, operatively coupled to a D input and the first and second XOR devices, capable of permutating the D input, the first XOR resultant and the second XOR resultant to produce a permutated resultant;

a first programmable mod divider, operatively coupled to a G input, capable of performing a plurality of modulo operations on the G input to produce an F resultant;

a second adder, operatively coupled to an E input, the F resultant, a Y2 input and the permutator, capable of summing the E input, the F resultant, and the Y2 input and the permutated resultant to produce a second adder resultant;

a second programmable mod divider, operatively coupled to the second adder resultant, capable of performing a plurality of modulo operations on the second adder resultant to produce a K resultant; and a register bank, operatively coupled to the second programmable mod divider, capable of selecting an address register based on the K resultant, and capable of outputting the initial frequency hopping channel.

5. The apparatus of claim 4, wherein the channel-quality based frequency hopping kernel comprises:

(a) the first adder as recited in claim 4;
(b) the first XOR device as recited in claim 4;
(c) the second XOR device as recited in claim 4;
(d) the permutator as recited in claim 4;
(e) the first programmable mod divider as recited in claim 4;
(f) the second adder as recited in claim 4, capable of summing the E input, the F resultant, the Y2 input and the permutated resultant to produce an alternate second adder resultant;
(g) the second programmable mod divider as recited in claim 4, capable of performing a plurality of modulo operations on the alternate second adder resultant to produce a K' resultant;
(h) a second register bank, operatively coupled to the second programmable mod divider, capable of selecting an address register based on the K' resultant, and capable of outputting an alternate hopping channel; and
(i) a mapping table, operatively coupled to the register bank, capable of mapping the alternate hopping channel to a substitute hopping channel, and capable of outputting the substitute hopping channel.

* * * * *